Aug. 3, 1937.    A. J. SMITH    2,089,008
METHOD OF AND MEANS FOR FORMING GLASSWARE
Filed Jan. 7, 1936    2 Sheets-Sheet 1
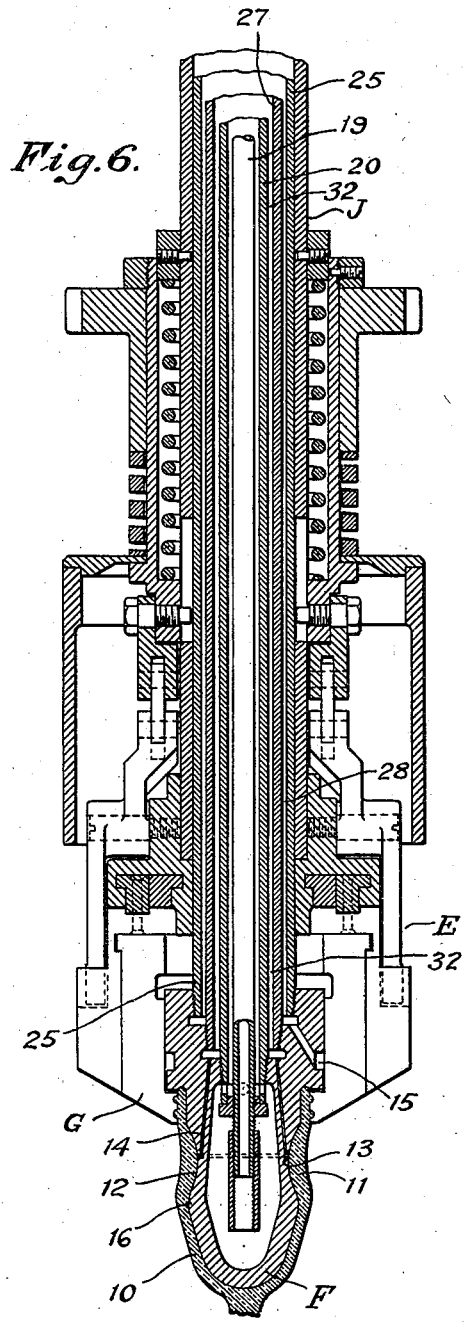
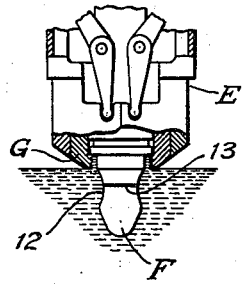
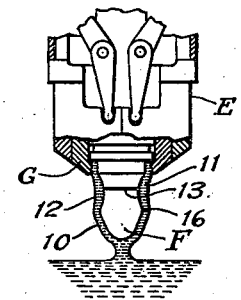
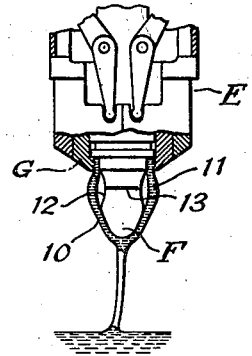
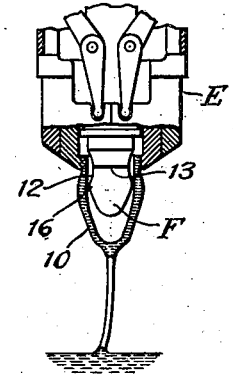
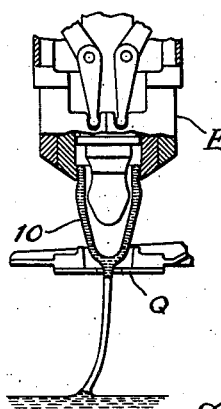
Inventor:
Algy J. Smith
by Brown + Parham
Attorneys.
Witness:
A. A. Horn

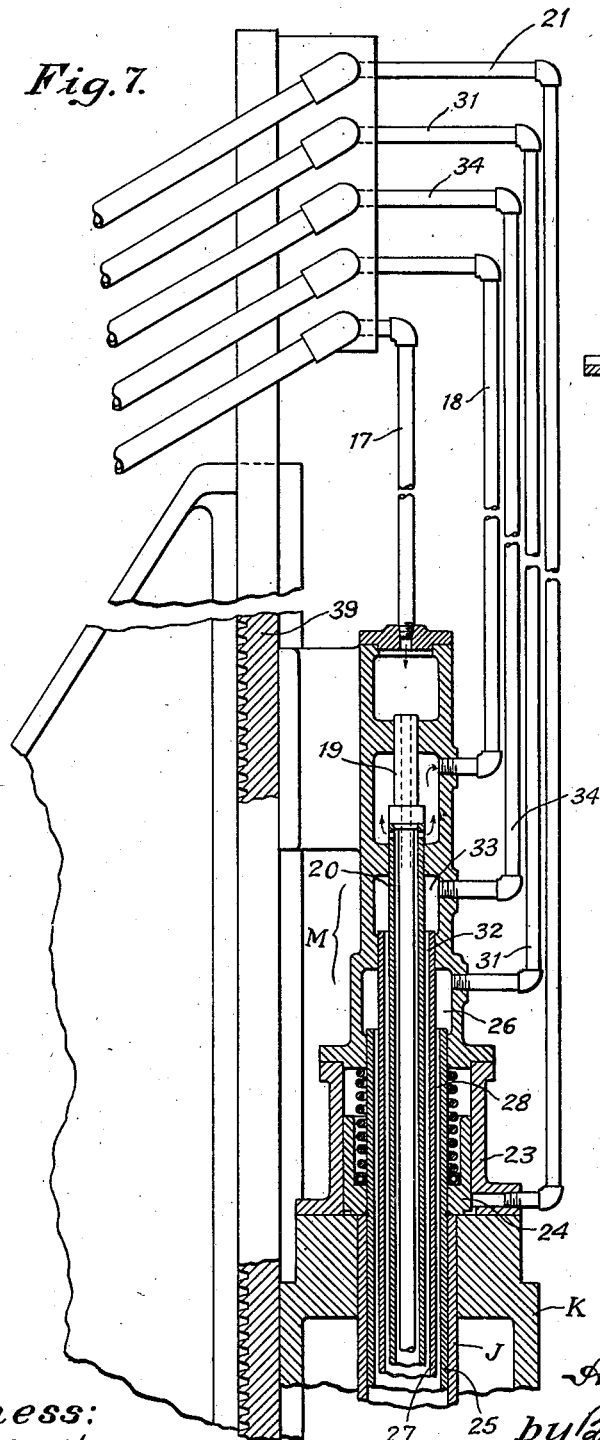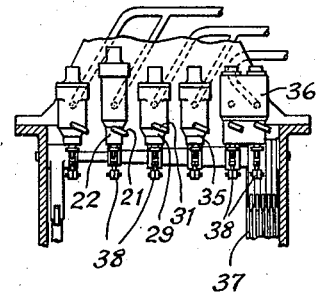

Patented Aug. 3, 1937

2,089,008

UNITED STATES PATENT OFFICE 2,089,008

METHOD OF AND MEANS FOR FORMING GLASSWARE

Algy J. Smith, Bloomfield, Conn., assignor to Hartford-Empire Company, Hartford, Conn., a corporation of Delaware Application January 7, 1936, Serial No. 57,873

6 Claims. (Cl. 49—5)

This invention relates to the manufacture of hollow glassware such as bottles and jars. It has particular relation to the method of forming hollow blanks wherein a water-cooled plunger and associated neck mold are immersed in a pool of molten glass and a blank is formed by applying suction to the neck mold or ring and by the formation of a coating on the plunger due to its chilling action on the surrounding glass. Such a method and apparatus for performing the same are shown for example in the patent to Kadow and Van Ness No. 2,020,032, granted November 5, 1935.

The formation of a blank by the above-mentioned method and with the apparatus of said patent is apt to result in ware having thin shoulders. This is due to the fact that the wall of the blank is of uniform thickness or is thicker below than above. When the plunger is retracted and the blank reheats, the glass flows downwardly by gravity and away from that portion which is to form the shoulder and is stretched by the weight of the lower portion, so that such portion becomes too thin to form a shoulder of the proper thickness and strength.

The object of the present invention is to provide a novel method and means of the above character for forming hollow blanks in which there is little, if any, likelihood of unduly thin shoulders being formed in the finished articles.

A further object of the invention is to provide a novel method of and means for forming hollow blanks of the above character and adapted to produce articles in each of which the glass is distributed in the desired manner and which articles therefore are improved in quality.

Other objects and advantages will be pointed out in the description of the invention as embodied in the accompanying drawings wherein:

Figs. 1 to 5 inclusive depict various stages of development of a blank in the performance of my novel method;

Fig. 6 is a view in vertical longitudinal section of a plunger and associated mechanism for carrying out the method;

Fig. 7 is a similar view of reciprocating and of fluid pressure distributing means associated with the parts shown in Fig. 6; and Fig. 8 is a view in sectional elevation of fluid control valves for the apparatus shown in Figs. 6 and 7.

In each of Figs. 1 to 5 inclusive, there is shown a gathering head E comprising a water-cooled head or plunger F, and a neck mold G which are operated by means later referred to. In Fig. 1, the head is shown immersed in a pool of glass to sufficient depth to submerge the plunger F and to permit glass to be drawn into the neck mold by the application of suction thereto. Fig. 2 shows the head in raised position and coated with a layer of glass formed by chilling and supported or held by the neck ring, this constituting the blank 10. This blank is shown enlarged in Fig. 6.

A novel feature of my method consists in the formation of a thickened portion of glass 11 in the upper portion of the blank which portion later forms the shoulder of the finished article. This is accomplished by providing an annular groove 12 (Fig. 6) in the plunger of suitable shape and depth to provide the desired extra thickness or "shoulder" in the blank.

To assist in the formation of the "shoulder" an annular suction groove 13 may be formed centrally of the groove 12 as shown in Fig. 6. Vacuum may be applied to groove 13 through the upwardly extending passages 14. Vacuum is applied to the outside of the neck finish through an independent passageway 15.

As shown in Figs. 2 and 6, the thickened portion or shoulder is formed on the interior of the blank and its presence prevents the retraction of the plunger because of the greater diameter of the bulging lower part 16 of the plunger. To permit such retraction, the vacuum is ended and a puff of air is admitted to groove 13 with the result shown in Fig. 3; that is, the thicker portion or shoulder is blown out, in effect transferring the "shoulder" from the inside to the outside of the blank. The plunger can then be retracted as illustrated in Fig. 4 without affecting the shape of the blank.

Following such retraction, additional puffs of air may be admitted to the blank to expand it to the desired size. Such expansion is shown in Figs. 4 and 5. At an appropriate time, either before or after the withdrawal of the plunger, the tail connecting the blank with the pool is severed by means of shears shown at Q in Fig. 5.

When the plunger is withdrawn from contact with the blank, the blank reheats. This reheating consists in a softening of the surface glass by the heat of the blank when the chilling plunger is removed.

As the glass softens, it elongates and flows downwardly. This decreases the wall thickness above and increases its thickness below. The method of my invention reduces or prevents such a deficiency of glass in the upper part of the blank as would result in an unduly thin and weak shoulder in the finished object.

Although not illustrated in the drawings, it will be understood that the hollow blank formed in the described manner is blown to final shape in a finishing mold in the usual way.

Considering in further detail the mechanism for performing the invention, the drawings show in Figs. 6, 7 and 8 only fragmentary parts of the mechanism, namely, the spindle assembly J, its supporting mechanism K which is reciprocated by slide 39, the fluid distributing conduits, and the valve mechanism.

The circulation of water through the plunger or head F takes place through conduits 17 and 18 which are in constant communication with the conduits 19 and 20 and through manifold M which are screw-threaded in the head F. The head F is raised or retracted by air pressure supplied through pipe 21 which leads from valve 22 of the valve assembly, to the cylinder 23 on the supporting mechanism K. This air pressure lifts piston 24 to which is welded sleeve 25, the bottom end of which also is screw-threaded in the head F, and the upper end of which extends into a chamber 26 of manifold M. Relief of such pressure permits the plunger F to lower in obvious manner.

Within sleeve 25 is sleeve 27 forming a passage 28. Through this passage 28 vacuum is applied to passage 15 and thence to the exterior neck finish. Such application of vacuum is controlled independently by a valve 29 of the valve assembly from which leads pipe 31 connected to chamber 26 of manifold M.

Formed between the sleeve 27 and the water conduit 20 which it surrounds is a passageway 32 which opens into chamber 33 of manifold M. This passageway is for the purpose of applying or supplying inside vacuum, puff-blowing air, and finish-blowing air to passages 14 and groove 13 of the head F in the manner previously described. Accordingly, pipe 34, which is connected to chamber 33, is joined to the inside vacuum valve 35 and to the double valve 36 which is adapted to supply intermittent puffs or continuous blowing air.

The valves are opened and closed at appropriate times by cams (not shown) on a timing drum indicated at 37, the cams of which operate bell cranks, the ends of which are indicated at 38.

It will be understood that the details of the timing means may be substantially the same as in the Kadow et al. patent referred to above.

Although my invention has been illustrated and described with reference to a specific type of machine, it will be understood that other forms of machine may be utilized and that variations may be made in the details of construction and the method of the invention without departing from the scope of the appended claims.

I claim as my invention:

1. The method of forming glass articles which comprises dipping a blank forming unit, including a neck ring and an associated plunger having a re-entrant annular portion below the neck ring, into a bath of molten glass, forming a blank by sucking glass into the space between the neck ring and the plunger and by accumulating a sheath of glass about the plunger, separating the blank from the glass in the pool, applying air pressure within the blank adjacent the re-entrant portion of the plunger to laterally distend that portion of the blank while maintaining suction in the neck ring, withdrawing the plunger from contact with the interior of the blank, and thereafter blowing the blank to final form.

2. The method of forming glass articles, which comprises dipping a blank forming unit including a neck ring and a cooled plunger into a bath of molten glass, applying suction to the interior of the neck ring to draw glass thereinto, extracting sufficient heat from the glass adjacent to the plunger to form a viscous layer of glass surrounding the plunger and having a relatively thick portion adjacent to the upper part of the plunger, applying pressure through the plunger to expand such portion out of contact with the plunger, retracting the plunger from contact with the glass, separating the blank from the glass in the pool and expanding the glass to final form.

3. The method of forming glass articles, which comprises dipping a blank forming unit including a neck ring and a cooled plunger into a bath of molten glass, applying suction to the interior of the neck ring to draw glass thereinto, extracting sufficient heat from the glass adjacent to the plunger to form a viscous layer of glass surrounding the plunger and having a portion below the neck of less internal diameter than a subjacent portion of the blank thus formed, applying pressure through the plunger to expand the relatively small internal diameter portion at least sufficiently to permit retraction of the plunger, retracting the plunger from contact with the glass, separating the blank from the glass in the pool, and expanding the glass to final form.

4. The method of forming hollow glass articles which comprises dipping a blank forming unit, including a neck ring and plunger, into a bath of molten glass, forming a blank having a finish thereon and a thickened re-entrant portion therebelow by the combination of suction applied through the neck ring and plunger and the cooling of the glass by the plunger, laterally expanding the re-entrant portion of the blank to permit retraction of the plunger, retracting the plunger, severing the glass from the glass in the pool and blowing the blank to final form.

5. In apparatus for forming hollow glass blanks, a neck mold, a plunger adapted to be positioned through and below the neck mold, said plunger being provided above its lower end with a re-entrant grooved portion to provide a relatively thick portion of the blank, means for dipping the plunger and neck mold into a pool of molten glass, means for applying a vacuum to the neck mold, and means for cooling the plunger for sucking glass into the neck mold and for forming a chilled coating of glass on the plunger, means for admitting air to the interior of the glass at the re-entrant portion of the plunger, and means for withdrawing the plunger from contact with the glass.

6. In apparatus for forming hollow glass blanks, a neck mold and associated plunger, the portion of such plunger adapted for projection below the neck mold having a portion below the neck mold of smaller diameter than a subjacent portion, means for dipping the neck mold and plunger into a pool of molten glass and raising them therefrom, independent means for applying vacuum to the neck mold and to the plunger, to suck the glass into the neck mold and about the plunger to form a blank having a finish and a thickened portion below the finish, means for severing the glass connecting the pool with the blank, means for admitting pressure through the plunger to distend the glass adjacent the said small diameter portion of the plunger, and means for withdrawing the plunger from the blank.

ALGY J. SMITH.